United States Patent
Georges et al.

(10) Patent No.: US 6,587,171 B1
(45) Date of Patent: Jul. 1, 2003

(54) ANGLE OF VIEW OF A LCD SCREEN BY A NOVEL BIREFRINGENT FILM STACKING

(75) Inventors: Laurent Georges, Bordeaux (FR); Laurent Bignolles, Bordeaux (FR)

(73) Assignee: Thomson-CSF Sextant, Velizy Villacoublay (FR)

(*) Notice: Subject to any disclaimer, the term of this patent is extended or adjusted under 35 U.S.C. 154(b) by 0 days.

(21) Appl. No.: 09/744,668

(22) PCT Filed: Jul. 23, 1999

(86) PCT No.: PCT/FR99/01816
§ 371 (c)(1),
(2), (4) Date: Jan. 29, 2001

(87) PCT Pub. No.: WO00/07067

PCT Pub. Date: Feb. 10, 2000

(30) Foreign Application Priority Data

Jul. 28, 1998 (FR) ................................. 98 09646

(51) Int. Cl.$^7$ ........................................... G02N 1/1376
(52) U.S. Cl. ........................................ 349/120; 379/121
(58) Field of Search ............................... 349/120, 121

(56) References Cited

U.S. PATENT DOCUMENTS

| | | | |
|---|---|---|---|
| 5,467,480 A | 11/1995 | Baudou et al. | |
| 5,479,294 A | 12/1995 | Darrieux et al. | |
| 5,504,603 A | * 4/1996 | Winker et al. | 349/117 |
| 5,517,337 A | 5/1996 | Dupin et al. | |
| 5,557,434 A | * 9/1996 | Winker et al. | 349/117 |
| 5,581,806 A | 12/1996 | Capdepuy et al. | |
| 5,623,730 A | 4/1997 | Baudou et al. | |
| 5,742,937 A | 4/1998 | Baudou et al. | |
| 5,895,106 A | * 4/1999 | VanderPloeg et al. | 349/120 |
| 6,014,769 A | 1/2000 | Baudou et al. | |
| 6,078,428 A | 6/2000 | Rambert et al. | |
| 6,157,471 A | 12/2000 | Bignolles et al. | |
| 6,158,866 A | 12/2000 | Gulli et al. | |
| 6,175,400 B1 | * 1/2001 | Duncan et al. | 349/117 |
| 6,262,849 B1 | 7/2001 | Potin et al. | |
| 6,342,872 B1 | 1/2002 | Potin et al. | |
| 6,356,325 B1 | * 3/2002 | Shimoshikiryo | 349/121 |

* cited by examiner

*Primary Examiner*—James Dudek
(74) *Attorney, Agent, or Firm*—Oblon, Spivak, McClelland, Maier & Neustadt, P.C.

(57) ABSTRACT

The present invention relates to a display device with a liquid-crystal cell comprising a twisted nematic liquid-crystal layer (40) placed between two crossed polarizers (46, 48) and comprising, between the liquid-crystal layer and at least one of the polarizers, a structure for compensating for the variations in contrast of the cell according to the angle of observation. This structure comprises at least two superposed negative uniaxial media such that the extraordinary optical axis of one medium (44, 42) is parallel to the normal to the cell and that of the other medium (43, 41) is inclined with respect to this normal on the one hand and with respect to the plane of the cell on the other. This compensating structure includes an additional layer (50, 49) of a positive uniaxial birefringent material.

9 Claims, 4 Drawing Sheets

ANGLE OF VIEW OF A LCD SCREEN BY A NOVEL BIREFRINGENT FILM STACKING

BACKGROUND OF THE INVENTION

1. Field of the Invention

The present invention relates to electrooptic display devices which modulate the light passing through them and more precisely to liquid-crystal panels.

These panels have useful characteristics for producing display screens in avionics: they are less bulky than conventional cathode-ray tube screens and they consume less power.

2. Discussion of the Background

On a liquid-crystal panel, an image is displayed by means of juxtaposed colored, or black, elementary dots. An elementary dot corresponds to light transmitted to its front face via a liquid-crystal cell illuminated on its rear face. A liquid-crystal cell generally comprises, from the rear to the front, a stack consisting of a polarizer, a first transparent substrate, a thin liquid-crystal layer, a second transparent substrate and an analyzer.

These transparent substrates include electrodes which are also transparent and when a voltage is applied to them this allows the liquid-crystal molecules to be subjected to an electric field perpendicular to the plane of the cell.

A liquid-crystal molecule has two remarkable characteristics; first, depending on its spatial orientation, it can modify the polarization of light passing through it and, secondly, an electric field can change its orientation.

Thus, the liquid-crystal layer at rest (with no voltage applied) and said layer with voltage applied lead to two distinct arrangements of the liquid-crystal molecules in the layer, defining two states of the cell—the activated state and the unactivated state—such that, for example, in one state the cell lets light through and in the other state it absorbs it. Depending on its state, the cell allows a white dot or a black dot to be displayed. Grays can be produced with intermediate voltages which impose other orientations on the liquid-crystal molecules. In addition, a color filter inserted into the stack of a cell allows a colored dot to be presented. This technology is used for displaying black-and-white or color images.

However, with a liquid-crystal panel the image perceived depends on the viewing angle at which the panel is observed. A high-quality image perceived by the observer when he looks along the direction normal to the plane of the panel is distorted when the direction at which he looks is inclined with respect to this normal direction. This in general reduces the use of a liquid-crystal panel to directions of observation departing little from the normal to the panel: the panel has a restricted viewing angle.

For a display screen which has to be able to be read by an observer whose position is not fixed and/or by several observers placed around the screen, such as, for example, a screen in the flight deck of an aircraft, the restriction in viewing angle of the liquid-crystal panel is a serious drawback.

For the user of the screen, the liquid-crystal layer has drawbacks in optical behavior. The drawbacks are especially due to the light contrast between the states of a cell which has the annoying feature of varying with the angle of observation and therefore of disrupting the observation of the panel.

This effect is explained by the natural birefringence of a liquid-crystal molecule whereby the modification by the molecule of the polarization of the light passing through it depends on the relative orientation between this light and the molecule and the change in angle of observation modifies the polarization of the light received by the analyzer and therefore modifies the transmission of the cell.

The prior art proposes partial corrections of this birefringence in certain situations in which it is a problem for various types of liquid-crystal cell.

We are interested more particularly in cells comprising a twisted nematic liquid crystal and mutually crossed polarizers (a polarizer and an analyzer) lying on either side of the liquid-crystal layer. In their unactivated state, these cells ensure that there is a high transmission of the light received. Their activated state corresponds to strong absorption of the light; an activated cell observed along its normal ensures that the light transmission is very low. The main drawback with these cells is, in the activated state, a marked increase in the light transmission when observed at an angle inclined with respect to the normal to the cell: a black dot observed normal to the cell becomes lighter when the observer moves away from the normal to the cell and the contrast between white and black decreases with this movement away from the normal. The contrast is the ratio of the transmissions in each state, i.e. the ratio of the transmission of the cell in the activated state to that in the unactivated state.

In the activated state, the birefringence of the liquid-crystal molecules is penalizing.

The prior art proposes to correct, always incompletely, this birefringence by adding a birefringent compensating film to the stack of, the cell.

A first known correction consists in using a uniaxial birefringent film having a negative refractive index anisotropy in the direction perpendicular to the plane of the cell. The film is a negative uniaxial film with an extraordinary optical axis normal to the cell.

Thereafter, corrections giving greater satisfaction have been developed. Thus, for example, patent EP 0 646 829 proposes a birefringent correcting film comprising a support having the characteristics of the first known correction and on which a discotic liquid crystal oriented by rubbing is polymerized. It describes a T type of birefringent film comprising a stack of two negative uniaxial media each having an extraordinary optical axis, one being parallel to the normal to the cell and the other being inclined with respect to this normal on the one hand and with respect to the plane of the cell on the other.

The problem consists in how to further widen the field of observation of a liquid-crystal panel comprising, in the stack of the cell and on each side of the crystal layer of the cell, at least two negative uniaxial media such that the extraordinary axis of one of these media is parallel to the normal to the plane of the cell and the extraordinary axis of another of these media is inclined both with respect to this normal and with respect to the plane of the cell.

Furthermore, especially in the case of a panel, such as those used for example in civil avionics, placed vertically, it is sought to further improve the viewing angle, particularly along the horizontal.

SUMMARY OF THE INVENTION

The invention provides a novel solution which consists in adding, to the stack of the liquid-crystal cell, a positive uniaxial birefringent compensating film to the birefringent films of the T type above.

More specifically, the invention provides a display device with a liquid-crystal cell comprising a twisted nematic liquid-crystal layer placed between two crossed polarizers and including, between the liquid-crystal layer and at least one of the polarizers, a structure for compensating for the variations in contrast of the cell as a function of the angle of observation, which structure comprises at least two superposed negative uniaxial media such that the extraordinary optical axis of one medium is parallel to the normal to the cell and that of the other medium is inclined with respect to this normal on the one hand and with respect to the plane of the cell on the other, characterized in that the compensating structure furthermore includes a layer of a positive uniaxial birefringent material.

In a known manner, a positive uniaxial material may be compensated for by a negative uniaxial material. Furthermore, a liquid-crystal molecule may be considered as behaving approximately like a stack of positive uniaxial materials. The liquid-crystal layer can therefore reasonably be compensated for by a stack of uniaxial materials having a negative birefringence, i.e. having a birefringence of opposite sign to the intrinsic birefringence of the liquid crystal.

The prior art teaches how to compensate for the positive birefringence of the molecules of the crystal layer by a particular stack of two negative uniaxial materials in a T-type film.

The novel solution of the invention consists in improving the compensation for the positive birefringence of the molecules of the liquid-crystal layer by supplementing the particular stack of the prior art with an additional layer of material whose birefringence is not of the opposite sign to that of the liquid crystal but, like it, has a positive birefringence.

The material of the additional layer is a positive uniaxial birefringent material. The extraordinary axis of this material is approximately parallel to the plane of the liquid-crystal layer. The axis is directed so as to be approximately perpendicular to the direction of alignment of the molecules on the face closest to the liquid-crystal layer.

In the thickness of the cell, the relative orientations of she twisted crystal layer, of the pair of polarizers and of the extraordinary optical axes of the second medium of the compensating structure and of the material of the additional layer maximize the viewing angle of the device in a plane perpendicular to the plane of the cell.

The additional layer preferably lies between the liquid-crystal layer and the T-type compensating film; the additional layer lies in the immediate vicinity of the crystal layer.

In the liquid-crystal layer, the directions of alignment of the molecules on the faces of the layer are preferably perpendicular.

Preferably, each polarizer is crossed with the alignment direction of the face closest to the liquid-crystal layer. In addition, the extraordinary axis of the material of the additional layer is crossed with the closest polarizer.

The invention makes it possible to appreciably widen the field of observation of a liquid-crystal panel by improving the level of the contrast, without introducing contrast inversion. In particular, it makes it possible to obtain a vertical screen that can be used with a very high viewing angle along the horizontal, typically plus or minus 60 degrees and quite a large viewing angle in the vertical direction, typically up to 40 degrees for an observer reading a panel placed lower than his face.

The vertical screen has both an absence of contrast inversion and a contrast greater than 40 for an angle of observation lying within an angular range, defined with respect to the straight line normal to the screen, of between +60 and −60 degrees along the horizontal and of between 0 and 40 degrees along the vertical above the normal line.

BRIEF DESCRIPTION OF THE DRAWINGS

Further features and advantages of the invention will become apparent on reading the description which follows and which is given with reference to the appended drawings in which.

DESCRIPTION OF THE PREFERRED EMBODIMENTS

Figure 1:
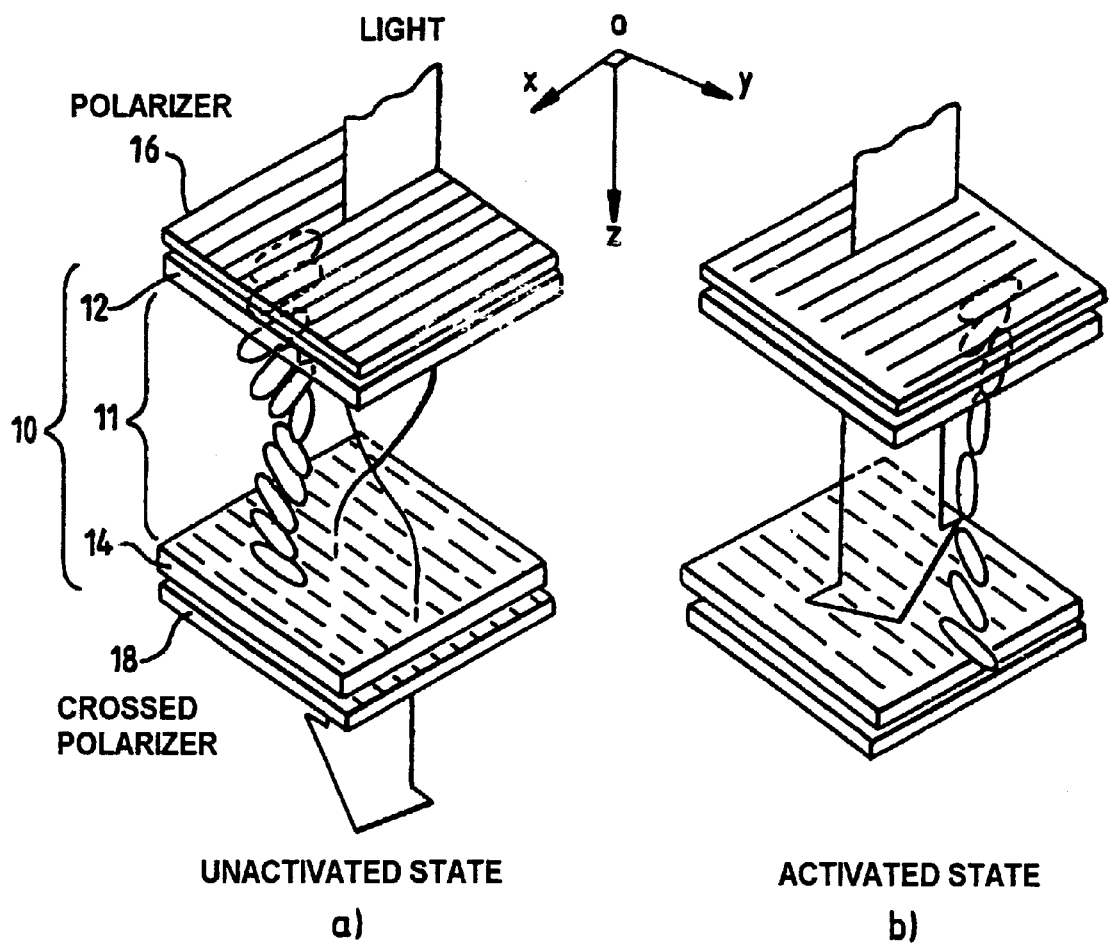
FIG. 1 shows schematically a liquid-crystal cell in a known configuration with crossed polarizers, FIG. 1a illustrating the unactivated state of the cell and FIG. 1b illustrating the activated state of the same cell.

A liquid-crystal cell is shown schematically in FIG. 1; it comprises, in a known manner, in the stack along the Oz axis a polarizer 16, a first transparent substrate 12, liquid-crystal molecules 11, a second transparent substrate 14 and an analyzer which is a polarizer 18 crossed with the first polarizer 16. The combination of the first 12 and second 14 substrates and of the molecules 11 forms a plane liquid-crystal layer 10 which is parallel to the Oxy plane.

In the case of a twisted nematic liquid crystal, the liquid-crystal molecules close to one, 12, of the two transparent substrates are oriented in a first alignment direction, for example parallel to the Ox axis, and the molecules close to the other, 14, substrate are oriented in a second alignment direction, for example parallel to the Oy axis. Preferably, the first and second alignment directions are mutually perpendicular.

The alignment may be obtained by treating the faces of the substrates 12 and 14 which are in contact with the liquid crystal, for example by rubbing the surface in the alignment direction.

When the cell is at rest it is in the unactivated state illustrated by FIG. 1a, in which the molecules 11 of the crystal layer are parallel to the Oxy plane of the cell and form, by means of the perpendicular alignment directions of the substrates, a helix in the thickness of the slayer 10. The light received on the rear face of the unactivated cell is linearly polarized by the polarizer 16 and then, on passing through the thickness of the twisted liquid-crystal layer 10, this linear polarization is modified by the birefringence of the molecules 11 through which the light passes and undergoes a rotation of 90 degrees due to the helix. On leaving the layer 10, the light is polarized perpendicular to the first polarizer 16 and it can therefore pass freely through the second crossed polarizer 18, the transmission direction of which is perpendicular to that of the first polarizer 16. In the unactivated state, the cell ensures that there is high light transmission.

When a voltage is applied to the cell, it is in the activated state illustrated by FIG. 1b in which an electric field perpendicular to the thin layer 11 is applied between the transparent electrodes, which are supported by the substrates 12 and 14 and to which the voltage is applied. The molecules 11 of the layer 10, which tend to align with the electric field, stand up with respect to the plane of the cell and the previously observed helix is destroyed in the thickness of the layer 10. In the activated state, the light also passes through the layer 11 but the arrangement of the molecules that it encounters tends to make it maintain a linear polarization in the direction imposed by the polarizer 16. The light leaving the layer 10 is absorbed by the second polarizer 18 crossed with the first polarizer.

In the activated state, the cell observed in the direction perpendicular to its plane transmits virtually no light. However, when the direction of observation is inclined with respect to the normal to the cell, the inclined light is affected by the birefringence of the molecules, which modifies its polarization and some of this light then passes through the second polarizer.

The arrangement of the molecules in the liquid-crystal layer to which voltage is applied is quite complex since the helix observed at rest is only partially destroyed.

A liquid-crystal molecule is elongate and it behaves optically approximately like a positive uniaxial birefringent medium whose extraordinary axis is oriented along the length of the molecule. The liquid-crystal layer to which a voltage has been applied may be represented in a very simplified manner by a stack of sublayers in which the birefringence is homogeneous and the molecules have the same orientation. In this representational model, each sublayer is a positive uniaxial birefringent medium, the direction of the extraordinary axis of which characterizes the sublayer.

In general, a first uniaxial birefringent material is optically compensated for by a second uniaxial birefringent material of opposite sign, such that the extraordinary axes of the two materials are parallel and such that the birefringences compensate for each other. Negative uniaxial materials are therefore good candidates for compensating for the positive uniaxial birefringence of nematic liquid crystals.

Patent EP 0 646 829 describes a T-type structure based on negative uniaxial materials for achieving partial optical compensation in a liquid-crystal cell. The T-type structure ensures that there is partial compensation for the variations in contrast of the cell according to the angle of observation. This T-type structure is parallel to a plane coincident, in the stack of the cell, with the plane of the latter and comprises a first layer of a negative uniaxial birefringent material which has its extraordinary axis perpendicular to this plane and on which is superposed a second layer of a negative uniaxial birefringent material which has its extraordinary axis inclined with respect to this plane and to the normal to this plane.

Figure 2:
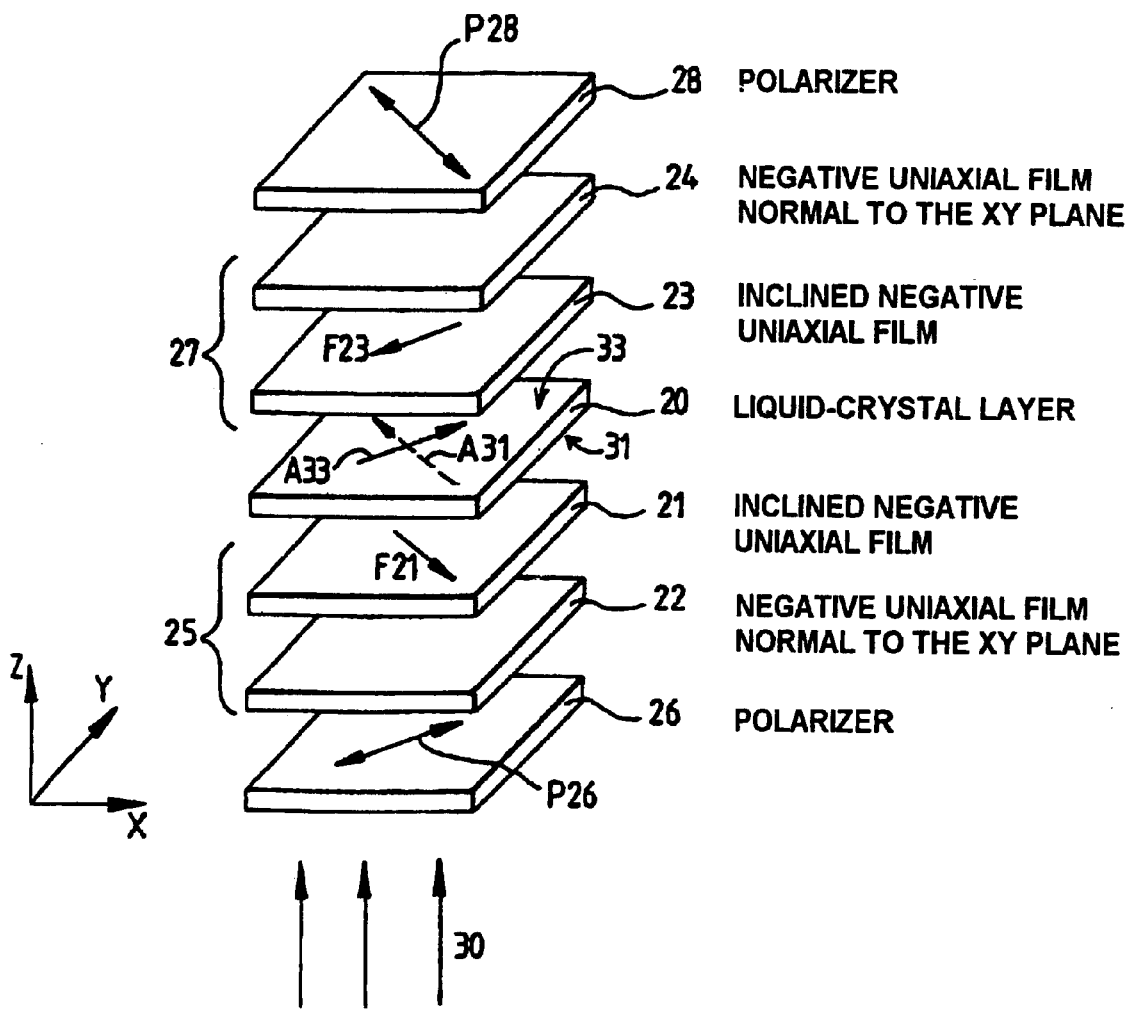
FIG. 2 shows a cell of the prior art with two optical compensating structures.

FIG. 2 shows, along the Z axis, the known stack of a liquid-crystal cell illuminated at the rear by the light rays 30 and comprising two optical compensating films 25, 27, one on each side of the plane liquid-crystal layer 20, these lying between the two polarizers 26 and 28. The plane of the cell is the XY plane. The rear film 25 and the front film 27 are, for example, of the type of those described in patent EP 0 646 829. Each T-type film 25, 27 includes in its thickness a negative uniaxial medium 22, 24 of extraordinary axis Z perpendicular to the XY plane of the cell and a negative uniaxial medium 21, 23 of extraordinary axis inclined with respect to the normal Z to the cell and with respect to the XY plane of the cell, the inclined uniaxial medium 21, 23 being closer to the liquid-crystal layer 20.

The polarizers 26, 28 of this cell are crossed, their transmission directions, P26 and P28 respectively, being mutually perpendicular. The crystal layer 20 has a direction of alignment A31 of the molecules on the rear face 31 in the XY plane which is perpendicular to that A33 of the front face 33, which is also in the XY plane. The crystal layer at rest has a negative helix, the twist of which is 90 degrees in its thickness; the twist is −90 degrees along the Z-oriented axis. The transmission direction P26, P28 of each polarizer is crossed with the alignment direction A31, A33 of the face closest to the liquid-crystal layer.

The orientation of the inclined axis of the uniaxial medium 21 adjacent to the rear face 31 of the layer 20 is defined in the XY plane by the direction F21 of the rubbing used in producing the film 25 according to the aforementioned patent. The direction F21 is parallel to the direction of alignment A31 of the molecules on the rear face 31, but in the opposite sense. Likewise, the orientation of the inclined axis of the uniaxial medium 23 adjacent to the front face 33 of the layer 20 is defined by the direction F23 parallel and in the opposite sense to the alignment A33 of the molecules of the front face 33, the direction F23 corresponding to the rubbing for producing the T-type film 27. The directions F21 and F23 are mutually perpendicular.

Figure 3:
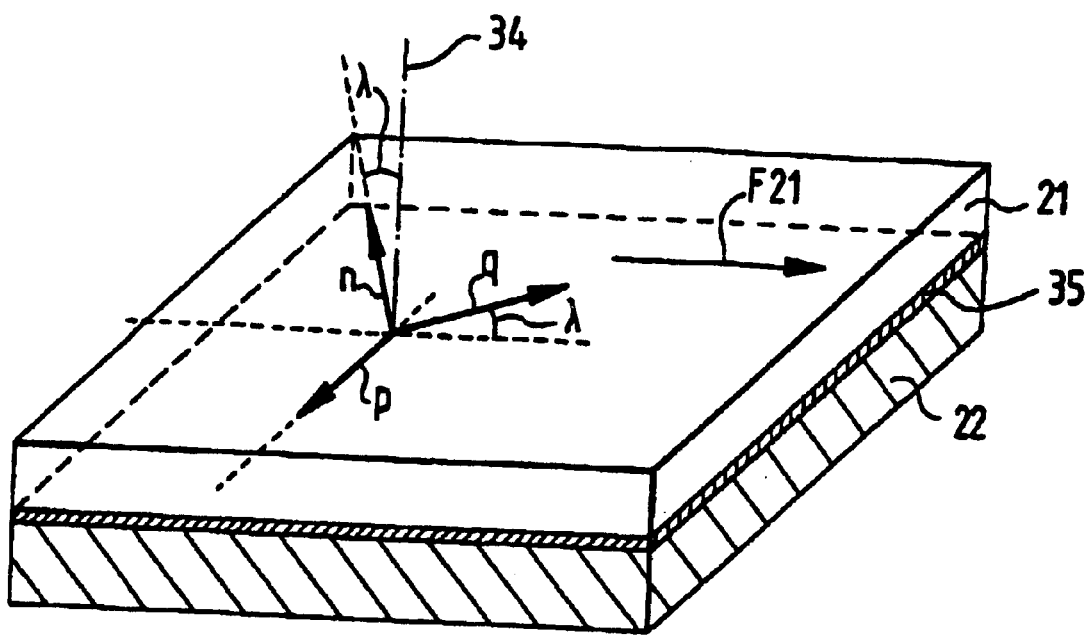
FIG. 3 shows part of a compensating film of the prior art.

FIG. 3 shows part of the rear compensating film 25 already illustrated in FIG. 2; this T-type film 25 comprises a negative uniaxial medium 22, the rapid extraordinary axis of which is oriented along the normal 34 to the film and the upper face 35 of which has been rubbed in the direction F21, and it also comprises a negative uniaxial medium 21, the extraordinary axis n of which is inclined with respect to this normal 34 by an angle λ in the plane containing the normal 34 and the rubbing direction F21. The index ellipsoid which characterizes the medium 21 is axisymmetric about the axis n, which is the optical axis or extraordinary axis of this medium 21. An ordinary axis p lies both in the XY plane of the cell and is perpendicular to the extraordinary axis n, a second ordinary axis q being perpendicular to the axes n and p. A wave arriving normal to the substrate 21 along the straight line 34 see two neutral lines: the slow axis is the axis p and the rapid axis is the projection of the axis q in the plane of the substrate.

Figure 4:
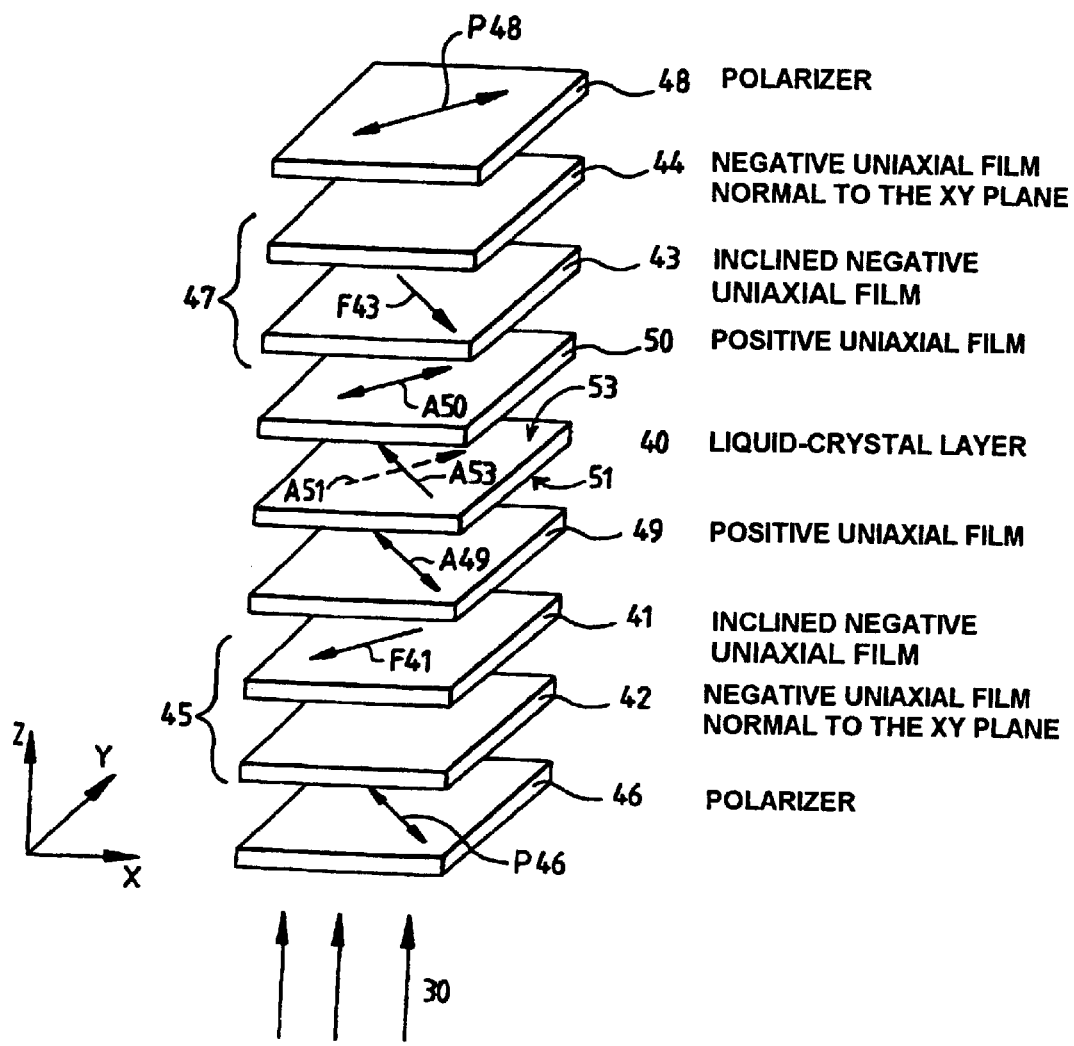
FIG. 4 shows one embodiment of the invention.

FIG. 4 shows an embodiment of the invention. In this embodiment, the liquid-crystal cell illuminated via the rear by light rays 30 comprises elements stacked in its thickness like the cell of the prior art in FIG. 2, namely a liquid-crystal layer 40 between two compensating films, for example of the T type, a film 45 at the rear and a film 47 at the front, the combination lying between two polarizers 46 and 48; it furthermore includes an additional layer 49, 50 of birefringent material having the feature of being a positive uniaxial material and preferably placed between each compensating film 45, 47 and the liquid-crystal layer 40. The positive uniaxial material of each additional layer is oriented in such a way that the additional layer, or preferably the pair of additional layers, improves the angle of observation of a panel comprising such cells.

The cell in FIG. 4 is observed from the front in the negative sense of the axis Z normal to the cell. The cell according to the invention comprises, in succession, between the polarizer 48 at the front and the polarizer 46 at the rear, the compensating film 47, for example of the T type, comprising a negative uniaxial first material 44 of axis parallel to the Z axis and a negative uniaxial second material 43 of axis inclined with respect to the Z axis and with respect to the XY plane parallel to the plane of the cell, the orientation of the second material being given in the XY plane by a direction F43, the additional layer 50 of a third material which is a positive uniaxial material, the layer 40 of twisted nematic liquid crystal having an alignment direction A53 at the front and an alignment direction A51 at the rear, the additional layer 49 of a positive uniaxial fourth material, the compensating film 45, for example of the T type, comprising an inclined negative uniaxial fifth material 41 whose orientation in the XY plane is given by a direction F41, and a negative uniaxial sixth material 42 of axis Z.

The alignment directions A53 at the front and A51 at the rear correspond to the directions in which the substrates of the crystal layer are rubbed when producing this layer 40.

In the invention, the extraordinary axis A50, A49 of the material of an additional layer 50, 49 is approximately in the plane of the cell and perpendicular to the alignment direction A53, A51 of the face closest to the liquid-crystal layer 40.

FIG. 4 illustrates the two possible senses of the extraordinary axis A50, A49, and what is important is its direction.

According to the invention, the extraordinary axis A50, A49 is inclined between 0 and 10 degrees with respect to the XY plane of the cell. This inclination is comparable to that of the molecules on the front face 53 or the rear face 51 of the liquid-crystal layer; this is because the molecules are not strictly aligned in the plane of the cell along the alignment directions A53 or A51—they are slightly inclined in a plane perpendicular to the plane of the cell and parallel to the alignment direction A53 or A51.

In this particular embodiment, the nematic liquid-crystal layer 40 at rest has in its thickness a helix whose twist has, for example, a positive value of 90 degrees along the Z-oriented axis in FIG. 4, with the alignment directions A51 and A53 on the front and rear faces of the layer 40 which are perpendicular. At rest, when the liquid crystal is not activated, the crystal molecules lying at the center of the thickness of the layer 40 in a plane parallel to the XY plane are approximately parallel to the Y axis. The Y axis is directed toward the top of the screen comprising cells according to the invention. The Y axis represents the bisector of the angular sector lying, in the direction of rotation of the helix of the liquid-crystal layer 40 at rest from the rear face 51 to the front face 53, between the alignment direction A51 of the rear face and the alignment direction A53 of the front face.

The polarizers are not mutually parallel; they are of the crossed type and the cell absorbs the light strongly when a voltage is applied to the liquid crystal of the layer 40. The transmission direction P48, P46 of each polarizer 48, 46 is preferably crossed with the alignment direction A53, A51 of the face 53, 51 closest to the crystal layer 40. These relative orientations between a polarizer and the direction of alignment of the closest liquid-crystal molecules have the advantage of limiting the contrast inversions. Thus, quite a large area of the observation space has no contrast inversion.

The transmission direction P48 of the first polarizer 48 at the front of the stack in FIG. 4 is approximately parallel to the alignment direction A51 of the rear face of the crystal layer 40.

The direction F43, or F41 respectively, is parallel and in the opposite sense to the orthogonal projection in the XY plane of the inclined extraordinary axis of the negative uniaxial second material 43, or the negative uniaxial fifth material 41 respectively. The second, or respectively the sixth, material 43, 41 is placed in the stack in such a way that the direction F43, F41 is perpendicular to the transmission direction P48, P46 of the closest polarizer and is in approximately the opposite sense to that of the alignment direction A53, A51 of the closest face to the crystal layer 40.

In the thickness of the cell, the relative orientations of the twisted crystal layer, of the pair of polarizers and of the extraordinary optical axes of the second 43 and fifth 41 media of the compensating structure and those of the materials of the pair of additional layers 49, 50 maximize the viewing angle of the device in a horizontal plane XZ which is perpendicular to the plane of the cell and to the Y axis representing the vertical of the device.

The cell according to the invention preferably has an additional layer on each side of the liquid-crystal layer 40, thereby having the advantage of making a correction which maintains the right/left symmetry with respect to the Y axis. The viewing angle is improved while complying with this symmetry. Alternative embodiments of the invention may be realized with a single additional layer, for example when the user of a vertical screen according to the invention is limited in his horizontal movements and observes the screen only from one side.

The additional layer is a positive uniaxial material having an optical retardation which is highly effective for correcting the variations in contrast according to the angle of observation, but it has quite a low value of 15 to 50 nanometers, equal to the thickness of the layer multiplied by the difference in the optical indices of the extraordinary axis and the ordinary axes. The thickness of the layer is preferably about one micron.

The additional layer of positive uniaxial material is, for example, produced by a rubbed substrate on which a liquid-crystal layer is deposited and then polymerized. The rubbed substrate may be composed of a neutral substrate, such as glass, to which a polyimide layer is applied, this layer being mechanically rubbed in a known manner. The process for manufacturing the faces of the twisted liquid-crystal layer may be repeated, the inclinations, with respect to the plane of the cell, of the extraordinary axis of the material of the additional layer and of the aligned molecules on each face of the crystal layer being comparable.

Observation of a panel comprising cells according to the invention is good for angles of observation lying within a wide range about the normal to the panel; in this angular range, the observer perceives no contrast inversion, and the contrast has a value greater than a minimum value of 40, acceptable for ease of viewing. The contrast is the ratio of the transmission of a cell in the activated state to that in the unactivated state.

For a vertical panel, the Y axis of which in FIG. 4 is directed toward the top of the panel, the invention allows the range of horizontal viewing angles to be widened, ensuring that the panel, when placed below the level of the user's eyes, can be easily read. In particular, a contrast at least equal to 40 is obtained for a viewing angle lying within an angular range, defined with respect to the straight line normal to the screen, of between +60 and −60 degrees along the horizontal and of between 0 and 40 degrees along the vertical above the normal line.

In an alternative embodiment, the liquid-crystal layer has, at rest, a negative helix along the Z axis, like the known cell illustrated in FIG. 2. The improvement in the compensation is obtained by adding, on each side of the liquid-crystal layer, an additional layer of positive uniaxial material whose axis is, as in the embodiment in FIG. 4, parallel to the transmission direction of the closest polarizer.

What is claimed is:
1. A display device with a liquid-crystal cell comprising a twisted nematic liquid-crystal layer placed between two crossed polarizers and comprising, between the liquid-crystal layer and at least one of the polarizers, a structure for compensating for the variations in contrast of the cell according to the angle of observation, which structure comprises at least two superposed negative uniaxial media such that the extraordinary optical axis of one medium is parallel to the normal to the cell and that of the other medium is inclined with respect to this normal on the one hand and with respect to the plane of the cell on the other, characterized in that the compensating structure includes an additional layer of a positive uniaxial birefringent material.

2. The device as claimed in claim 1, characterized in that the positive uniaxial material is oriented in such a way that the additional layer improves the angle of observation of a panel comprising such cells by maximizing the viewing angle in a plane perpendicular to a panel comprising such cells.

3. The device as claimed in claim 1, characterized in that the extraordinary axis of the positive uniaxial material of the additional layer is parallel to the plane of the cell and perpendicular to the direction of alignment of the liquid-crystal molecules of the face closest to the liquid-crystal layer.

4. The device as claimed in claim 1, characterized in that the additional layer lies between the negative uniaxial media and the liquid-crystal layer.

5. The device as claimed in claim 1, characterized in that it comprises two compensating structures lying between the polarizers and on each side of the liquid-crystal layer each structure including an additional layer.

6. The device as claimed in claim 1, characterized in that the helix which the molecules of the liquid-crystal layer at rest form has a twist of 90 degrees.

7. The device as claimed in claim 1, characterized in that each polarizer is crossed with the alignment direction of the face closest to the liquid-crystal layer and the extraordinary axis of the material of the additional layer is crossed with the closest polarizer.

8. The device as claimed in claim 1, characterized in that the inclination of the extraordinary axis of the material of the additional layer with respect to the plane of the cell is less than 10 degrees.

9. The device as claimed in claim 1, characterized in that the optical retardation introduced by the additional layer is between 15 and 50 nanometers.

* * * * *